Nov. 9, 1937.  A. D. LUND  2,098,808
SIZING MACHINE FOR BATTERY GRID PLATES
Filed Dec. 23, 1935  5 Sheets-Sheet 1

INVENTOR
ARTHUR D. LUND
BY
ATTORNEY

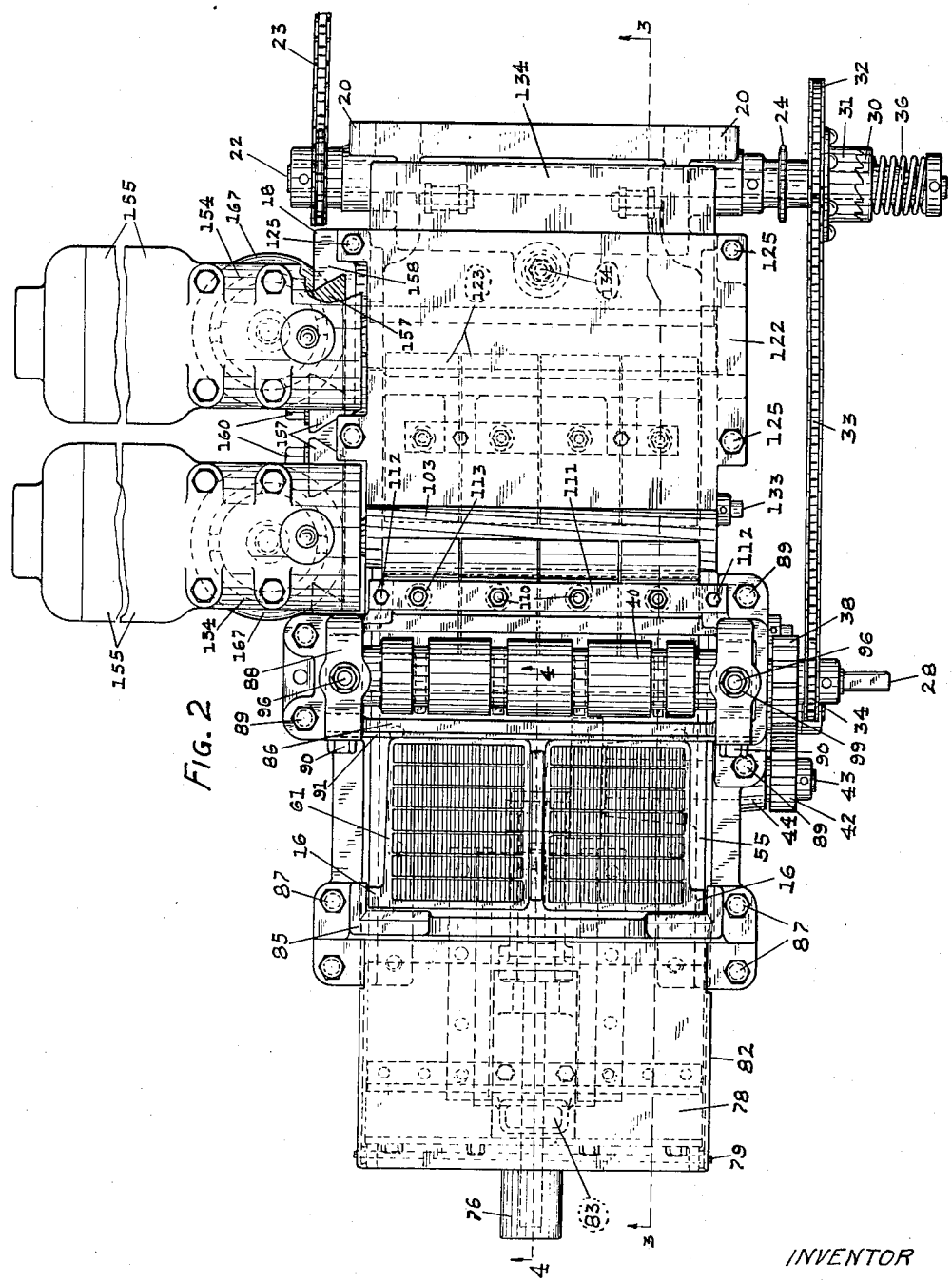

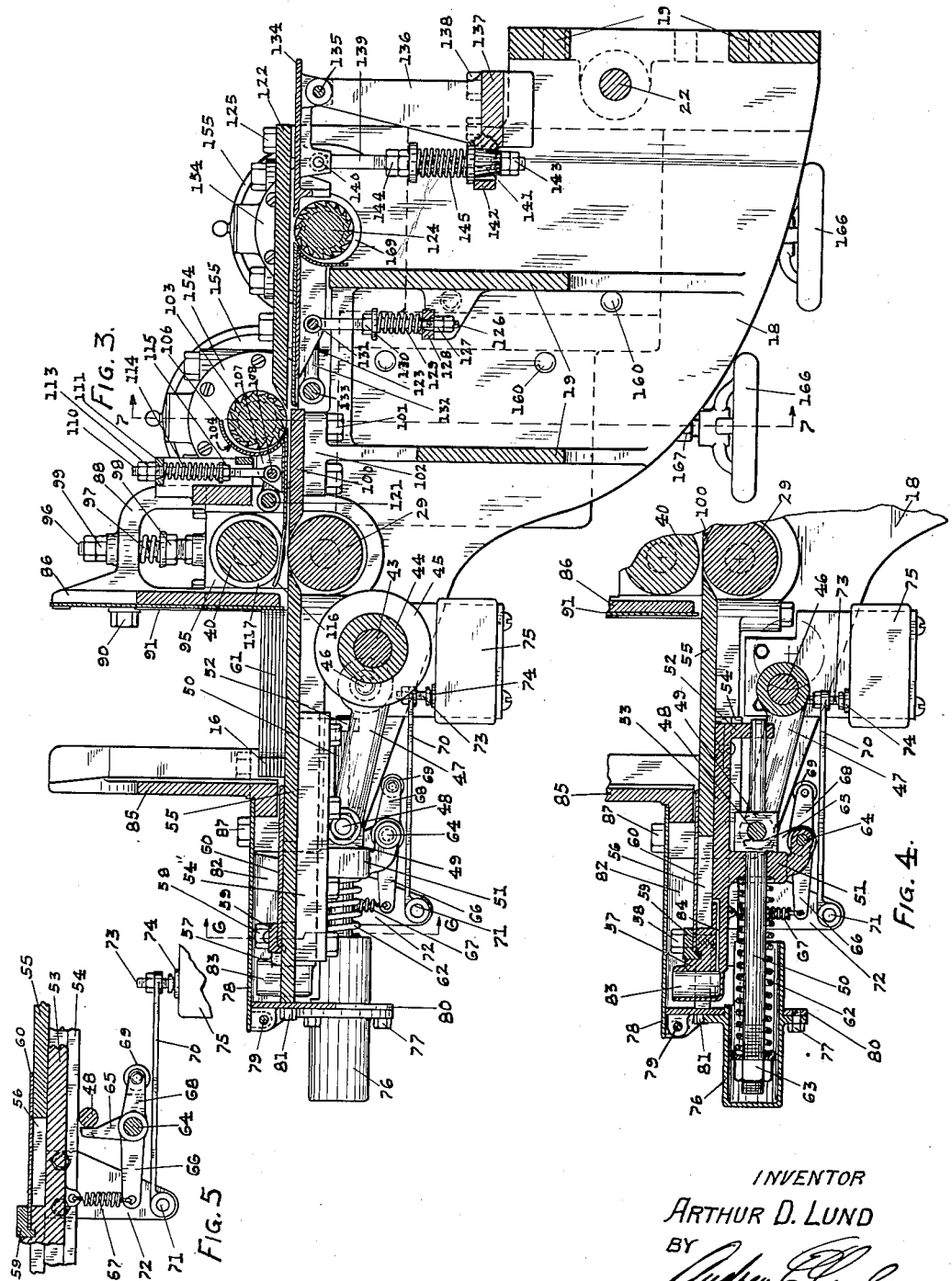

Nov. 9, 1937.　　　A. D. LUND　　　2,098,808
SIZING MACHINE FOR BATTERY GRID PLATES
Filed Dec. 23, 1935　　　5 Sheets-Sheet 4
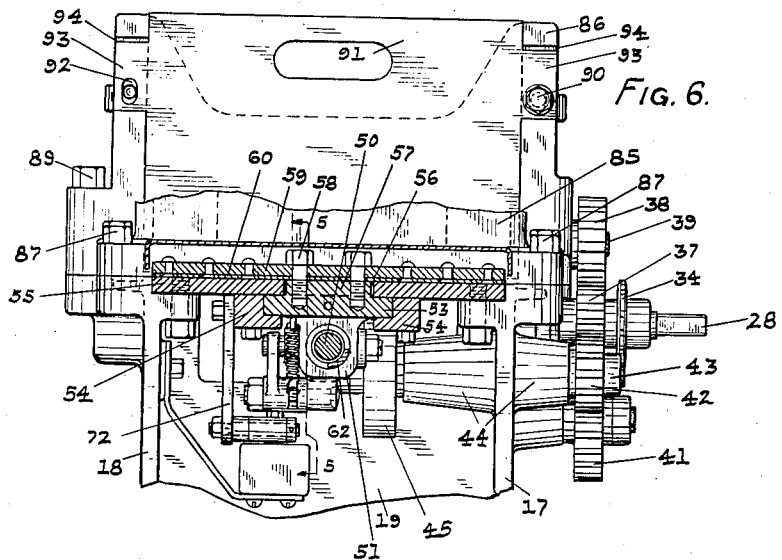
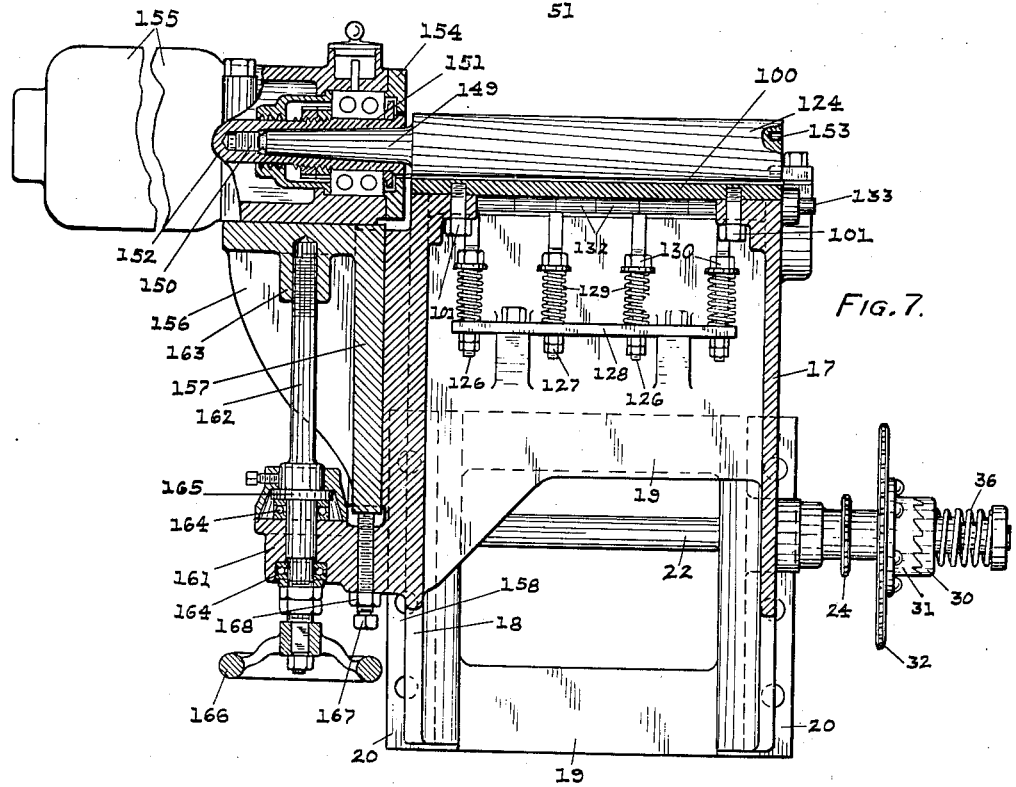
INVENTOR
ARTHUR D. LUND
BY
ATTORNEY.

Nov. 9, 1937. A. D. LUND 2,098,808
SIZING MACHINE FOR BATTERY GRID PLATES
Filed Dec. 23, 1935 5 Sheets-Sheet 5
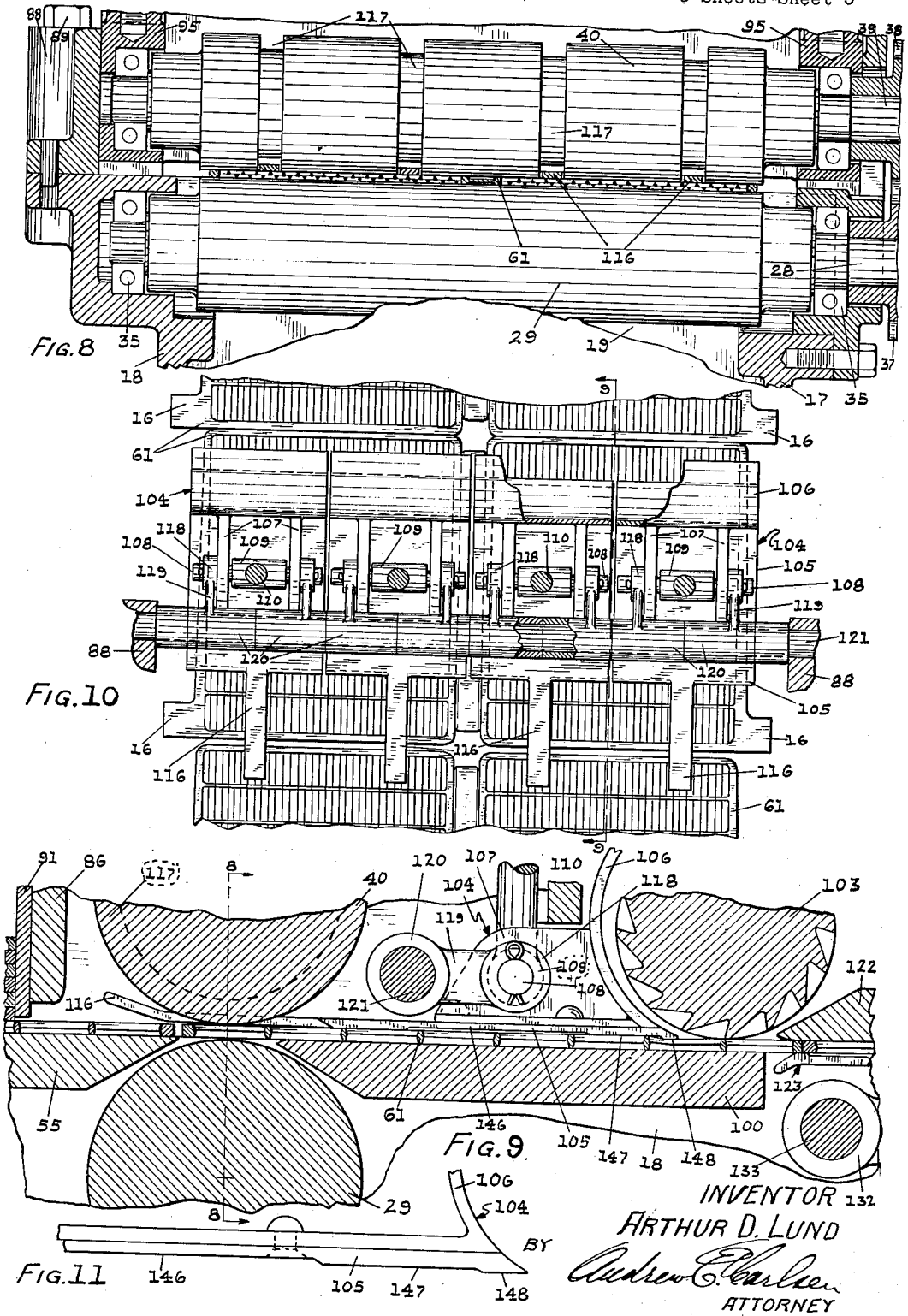
INVENTOR
ARTHUR D. LUND
BY
ATTORNEY Patented Nov. 9, 1937

2,098,808

UNITED STATES PATENT OFFICE 2,098,808

SIZING MACHINE FOR BATTERY GRID PLATES

Arthur D. Lund, Minneapolis, Minn.

Application December 23, 1935, Serial No. 55,855

19 Claims. (Cl. 90—11)

This invention relates to machines for operating on battery grid plates, during the course of manufacture thereof, to reduce them to uniform thickness, after they have been cast but before they are filled with the active material or so-called grid paste and placed in the battery cell; and the primary object is to provide a novel, efficient and practical machine for that purpose.

Under existing methods of battery manufacture the grids are in most instances cast, pasted, and otherwise treated and handled in plates, with two grids to the plate and with the terminal lugs of the plates projecting in opposite directions, as indicated in Fig. 2 of the present application drawings. Such grid plates may be made in various types of automatic, high speed, casting machines known in the art and of which I have designed several, including those illustrated in my United States Patents No. 1,747,552, issued February 18, 1930; No. 1,811,143, issued June 23, 1931; No. 1,843,774, issued February 2, 1932; No. 1,843,775, issued February 2, 1932; No. 1,843,776, issued February 2, 1932; No. 1,843,777, issued February 2, 1932; No. 1,930,815, issued October 17, 1933; No. 1,959,484, issued May 22, 1934; and No. 2,028,790, issued January 28, 1936.

After the plates have been cast, and before they are cut to separate the grids for battery use, they are filled with the active material. This may be done in automatic pasting machines such as disclosed in my copending patent applications Ser. No. 726,744, filed May 21, 1934, and Ser. No. 41,584, filed September 21, 1935, both for Grid pasting machines.

It is found that in the casting of the grid plates it is practically impossible to secure uniformity of thickness as between the several plates, and even throughout the same plate, regardless of the care and precision exercised in designing and operating the casting machine. The inequalities in question result from wear; inaccuracy and slippage of adjustments; mold distortion under heat and pressure or because of defective cooling; uneven applications of plate smoking (to loosen from mold); differentials in the molten metal pressures, and other causes virtually beyond control. The variations in plate thickness are not of substantial proportions, considered singly, seldom exceeding fifteen one-thousandths of one inch. In the aggregate, however, and particularly in plants that have a large volume of production, the objection is most significant not only from the standpoint of material wastage, but also because of the reduction to battery efficiency. That uniformity is of importance is evidenced by the fact that a grid is no stronger than its thinnest portion, and a cell is no stronger than its weakest grid. Furthermore, any paste applied beyond the predetermined or normal thickness is superfluous and represents a waste of material. For these reasons I have designed the present machine which will trim each and all of the grid plates passing through it to a uniform size thickness so that when passed into a pasting machine the latter will accordingly apply and distribute the paste material in a uniform and most efficient manner.

In the accompanying drawings, which illustrate a preferred embodiment of the invention:

Fig. 1 is a side elevation of the machine as seen from the right, the left end of the machine as shown in this figure being considered as the front, for purpose of convenience in description. It may be noted that the sizing mechanism may be designed and used as a unitary construction, but is here disclosed as an attachment for a pasting machine as illustrated in my copending application Ser. No. 41,584, a modified portion of which is shown in the instant Fig. 1.

Fig. 2 is a plan view of the sizing unit shown in Fig. 1, being removed from the pasting machine.

Fig. 3 is a sectional elevation on line 3—3 in Fig. 2.

Fig. 4 is a sectional elevation on line 4—4 in Fig. 2.

Fig. 5 is a detail sectional elevation on line 5—5 in Fig. 6.

Fig. 6 is a cross sectional elevation on line 6—6 in Fig. 3, with fractional portions broken away.

Fig. 7 is a cross sectional elevation on line 7—7 in Fig. 3, with fractional portions broken away.

Fig. 8 is a detail elevation of certain feed rolls, and with adjacent parts in section as on line 8—8 in Fig. 9, but on a reduced scale therefrom.

Fig. 9 is an enlarged detail section on line 9—9 in Fig. 10.

Fig. 10 is a detail plan view, looking down on Fig. 9, but with some parts omitted for purpose of illustration.

Fig. 11 is an enlarged detail side elevation of a portion of one of the presser plates.

Figure 1:
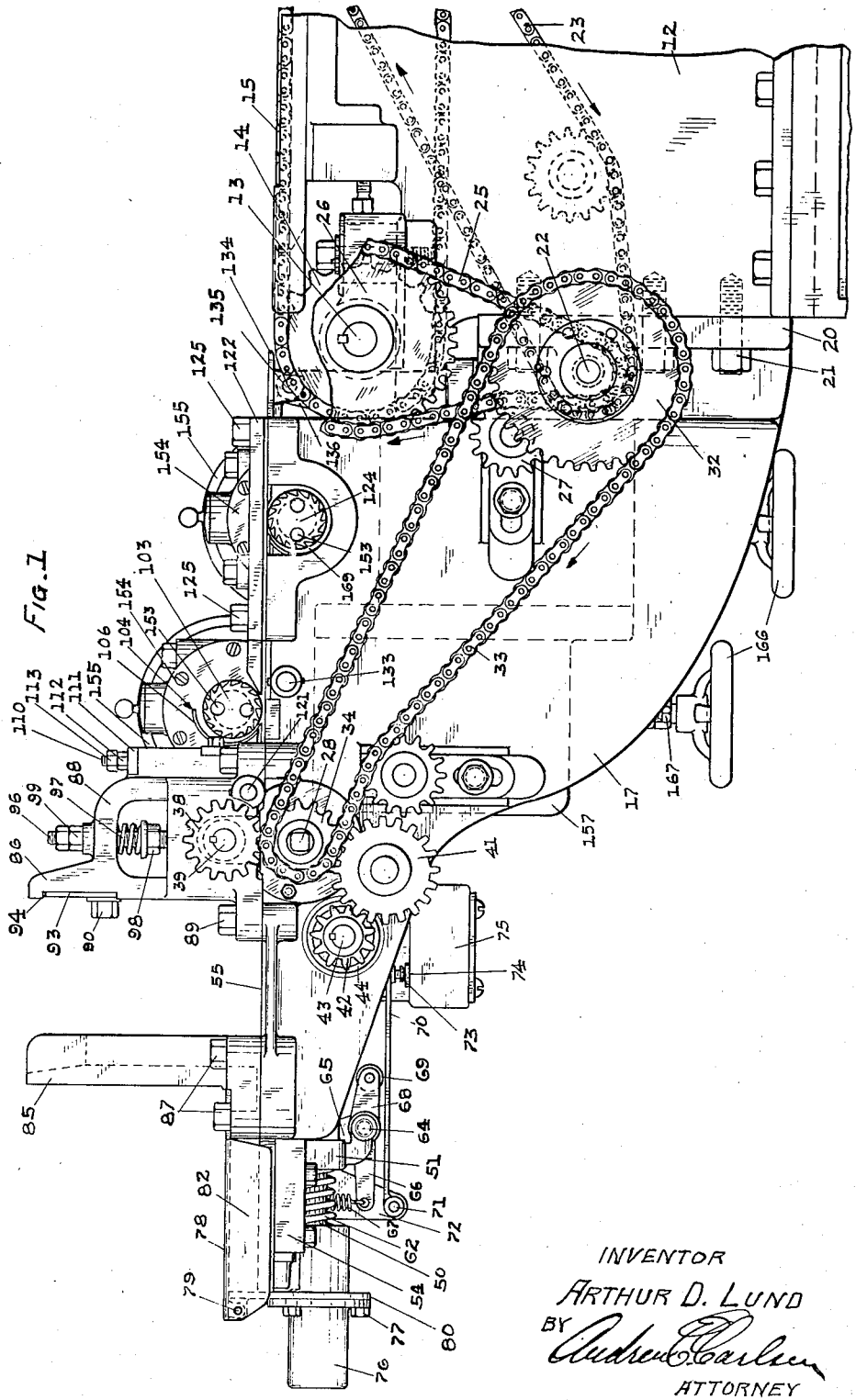

The invention contemplates generally the provisions for supporting a stack of unsized grid plates, a horizontal passageway leading rearwardly from the support, a reciprocating stripper for successively removing the plates from the bottom of the stack and moving them into the passageway, feed mechanism for progressively moving the plates through the passageway to a point of delivery, and upper and lower rotary cutters for successively trimming the upper and lower surfaces of the grids, all coordinated with various control and adjuster devices to attain the desired results. The rotary cutters are independently driven by separate electric motors, but the stripper and feed devices are operated from a common shaft, which in the present instance is driven from and by the pasting machine and in synchronism with a receiving conveyor thereof.

In Fig. 1 I have indicated, as at 12, the main frame of the pasting machine, in which frame is journaled a shaft 13 rotatably supporting sprocket gears 14 over which pass spaced conveyor chains 15, for receiving the plates and conveying them to the paste applying mechanism. The conveyor chains 15 correspond to chains 118 in my application Ser. No. 41,584, and are so spaced that the plates will be carried in transverse suspended positions between the chains, with the outwardly directed lugs 16 (Figs. 2 and 3) resting on the upper runs of the chains.

The sizing machine has a heavy cast frame including side walls 17 and 18 connected by integral cross members 19, and is provided at its rear with integral flanges 20 which are rigidly secured to frame 12 by bolts 21. A main power shaft 22 is transversely journaled in the frame walls 17—18, and receives power from the pasting machine through a chain 23 at the left side of the machine. At the right or opposite side of the machine the shaft 22 has a sprocket pinion 24, operating through a chain 25 and sprocket gear 26 to supply power to the conveyor shaft 13. An adjustable idler 27 may be employed to adjust the tautness of chain 25.

The shaft 22 also operates a shaft 28 of a feed roll 29 journaled in bearings 35 (Fig. 8) of the frame 17—18, power being transmitted through clutch collars 30, 31, sprocket gear 32, chain 33, and a sprocket pinion 34 fixed on shaft 28. The clutch collar 31 is rotatable on shaft 22 but has slanted teeth engageable by corresponding teeth of collar 30 which is splined on shaft 22 and is spring pressed against collar 31, with a result that when shaft 22 is rotating in clockwise direction, as shown in Fig. 1, it will positively drive the gear 32, through the clutch 30—31. On the other hand should the gear 32 be rotated, by chain 33, it may do so without turning shaft 22 and its other connections as the spring, 36, will permit the clutch collar 30 to move out of driving engagement with collar 31. It will be noted that shaft 28 has a squared end, for reception of a hand crank (not shown), and the purpose of the clutch arrangement just described is to permit manual operation of the feed mechanism until the machine is ready to be power driven, it being occasionally necessary to start at very slow feeding speed until adjustments have been made.

The shaft 28 has a spur pinion 37 which drives a pinion 38 on shaft 39 of an upper feed roll 40, and the pinion 37 also meshes with an idler gear 41 to drive a pinion 42 on a shaft 43 journaled in an elongated hub 44 of side wall 17. At its inner end the shaft 43 has a heavy disc 45 with an eccentric pin 46 driving a pitman 47. The front end of the pitman (see Figs. 3, 4) is pivoted as at 48 to a block 49 which is rigid with a bar 50 that is slidable in depending lugs 51 and 52 of a reciprocating carriage 53, this carriage member having its side edges slidably retained in inwardly opposed horizontal channels 54. The channel members are bolted to the underside of a bench plate 55 adjacent to a central longitudinal slot 56 therein, and up into which slot extends an integral lug 57 of the carriage member 53. Upon this lug is secured, by bolts 58, a cross arm 59 to which is riveted a stripper plate 60 which rests and slides directly upon the upper surface of the bench 55. As the stripper plate 60 is longitudinally reciprocated it successively engages the lowermost grid plates, 61, of the stack supported on the rear part of the bench, and pushes them edgewise into engagement between the feed rolls 29 and 40 (Figs. 3, 9). The return or forward movement of the stripper is positively effected through the pitman action, the block 49 acting directly on the carriage lug 51.

The rearward or feed movement of the stripper plate 60 is not positive or unyielding, and is subject to resistance control, it being necessary to provide means to prevent the destructive or damaging application of power when for any reason a grid plate may become stuck or jammed. This is accomplished by the following described mechanism.

The bar 50, being longitudinally slidable in the lugs 51 and 52, can be moved rearwardly from the position shown in Fig. 4, but this movement is subject to the resistance offered by a spring 62 which encircles the bar and is compressed between the lug 51 and a tension adjusting nut 63 at the front end of the bar. The spring 62 is of sufficient strength so that it will cause the carriage 53 to move forwardly under the action of the pitman 47 under normal operating conditions. Should the stripper plates 60, however, meet with abnormal resistance such as might be caused by the sticking or jamming of a grid plate, then the spring 62 will yield sufficiently to permit the bar 50 to move rearwardly in the bearing lugs 51 and 52. When this occurs, the pivot pin 48 connecting the pitman 47 to the block 49 will also move rearwardly. In order to utilize this movement to shut off the power to the machine until the obstructing grid plate has been removed, I pivotally secure to an extension of the lug 51, as at 64, a three-armed lever, one arm 65 of which engages the pin 48, as shown particularly in Fig. 5. A forwardly extending arm 66 is connected by a spring 67 to the carriage member 53 in a manner tending to press the arm 65 rearwardly against the pin 48. A third arm 68 of the lever extends rearwardly, and has a roller 69 which normally travels immediately over a rod 70 which is pivotally secured as at 71 to a bracket 72 which, as shown in Fig. 6, is rigidly secured to one of the channel members 54. At its rear end the rod 70 has an adjustable screw 73 which rests on a control button 74 of a switch box 75, and in such a manner that when the rod 70 is depressed it will push the button 74 to open the main circuit to the machine so that the operation thereof will be stopped.

It will now be seen that when the stripper plate 60 meets with abnormal resistance, the pitman pin 48 will move rearwardly with respect to the carriage 53, and when this occurs the spring 67 will operate to depress the roller 69 until it in turn depresses the rod 70 and produces the circuit opening action. The forward end of the bar 50 and spring 62 are conveniently covered and protected by a flanged cup member 76, secured as at 77 to an end plate 80 anchored to the front end of the bench 55, as at 81.

It may also be noted that a cover plate 78 is placed over the stripper plate mechanism, and may be employed as a shelf to support an extra stack of grid plates to be subsequently placed in the machine. This plate is pivotally secured as at 79 to the end plate 80, and has reinforcing side flanges 82. The shelf plate 78 may be swung open upwardly and forwardly to expose the stripper mechanism, which is done for instance to occasionally grease or oil the stripper plate. At such time also oil may be filled into a cup 83 which communicates through a duct 84 (Fig. 4) to lubricate the contact surfaces between carriage 53 and bench 55.

The grid stack 61 (Figs. 2 and 3) supported on and to be stripped from the bench 55, is guided between front and rear walls or standards 85 and 86 which cooperate with the bench to form a magazine or hopper. The wall 85 is anchored to lugs at the upper ends of frame walls 17 and 18, by bolts 87 (Figs. 2 and 6), and includes a cross web integrally connecting vertical end members which are angularly formed to receive and guide the adjacent grid corners. The rear wall or standard 86, incorporates integral frame members 88 in which the shaft 39 and other working parts are mounted. The frame unit 86, 88 is rigidly mounted on the main frame by bolts 89.

Adjustably secured, as by stud bolts 90 to the front or inner side of the standard 86, is a guide plate 91, the lower edge of which is spaced above the bench 55, and spaced below the intermediate lower edge of wall 86 (Figs. 3, 4, and 11) to restrain the plate stack against rearward movement while permitting only the lowermost grid plate to be discharged rearwardly from under the stack under the action of the stripper plate. The size of the discharge opening must be subject to adjustment, however, so as to accommodate grid types of different size thicknesses, as some grid plates are heavier and thicker than others depending upon the uses to which they are to be put. For this reason the plate 91 is vertically adjustable although only two adjustments are ordinarily required. To secure these adjustments the bolts 90 extend through slots 92, in plate 91 (Fig. 6), and the plate proper is provided with laterally projecting lug portions 93 having freedom for limited vertical movement in slots 94 of the standard 86. Thus by loosening the bolts 90 the guide plate 91 can be quickly and easily adjusted to permit the passage under the plate only of grids having a maximum size thickness. In consequence the plate 91 not only insures a one by one plate discharge, but also prevents passage into the cutter mechanism of an oversize plate which might accidentally get into the stack and for which the trimmers are not adjusted.

As the grid plates are stripped from the stack they are moved into contact between the feed rolls 29 and 40 which, as previously noted, are both power driven at a constant speed to move the plates into contact with the trimmers. In order that the clamping action between the rollers may be resilient, while also uniform throughout their lengths, I mount the shaft 39 at the ends of roller 40, in bearing blocks 95 which are vertically guided in the ends of frame 88. These blocks are connected with frame 88 (Figs. 1 and 3) by bolts 96, which pass through the frame, and springs 97 which act against adjuster nuts 98 to depress the roller. The downward movement of the roller is limited by a nut 99 stopping against the frame, so that the spacing between rollers 29 and 40 may be regulated for various sizes of plates and to adjust the clamping pressure thereon during the feed action.

As the grid plates are moved rearwardly under the action of the feed rolls 29 and 40 they are received on a horizontal, primary cutting table 100 which consists of a heavy transverse plate secured at its ends by bolts 101 to inwardly projecting lugs 102 of the side walls 17 and 18. The forward edge of the table 100 is beveled to better receive the grid plates from the roller 29, and the upper face of the table is machined very smooth and flat so that the grid plates may more readily pass thereover.

As the plates approach the rear edge of the table 100 their upper faces come in contact with a rotary cutter 103 which extends transversely of the machine and has an annular series of spaced cutter teeth, which teeth extend in spiral formation throughout the length of the cutter. The cutter is rotated at a high rate of speed, and has for its purpose to shave or mill off as much of the grid plate material as may project beyond the desired upper surface of the plate. In order to insure proper pressure on the grid plates as they travel over the table 100, and to insure proper retention of the plates as they come into engagement with the cutter 103, I provide a transverse series of shoe units designated generally by the numeral 104. Each of these units comprises a lower horizontal plate member 105, an arcuate rear wall 106 serving as a guard about a portion of the cutter 103, and a pair of vertical flanges or webs 107 by which the shoe units are carried and held in operative position. A shaft 108 extends through the webs 107 to each unit, and about this shaft is secured a collar 109 formed integrally with the lower end of a bar 110. The bars 110 are slidably mounted at their upper ends in a cross piece 111 secured as at 112 to the frame 88. Adjustable nuts 113 limit the downward movement of the bars 110, and springs 114 are compressed between the bar 111 and nuts 115 on the bars 110 to yieldably press the shoe units downwardly into contact with the rearwardly moving grid plates.

It may be noted that the cross bars 108 are loosely mounted in the collars 109 so that there will be sufficient play between the two to permit the shoe plates 105 to tilt slightly in a transverse plane. Thus one side of the shoe unit will not be held against the grid plates with more pressure than the other side, and there will be sufficient freedom to permit the plate pressure to adjust itself transversely. It will be noted that each of the shoe plates 105 is provided with a forwardly extending integral finger 116, and that the feed roll 40 is provided with a longitudinally spaced series of annular recesses 117 to accommodate the fingers 116. It may also be noted with particular reference to Fig. 9, that the front ends of the fingers 106 are bent upwardly. This arrangement of feed roll and receiving fingers insures the proper reception of the grid plates into the feed passageway, and prevents the oncoming grid plates from in any way stopping against obstructions such as the forward edges of the shoe plates.

To insure the proper retention of the guide shoes longitudinally of the machine while yet permitting of the necessary flexibility of action, I secure the ends of the bars 108 in bearings 118 of link arms 119 having collars 120 which are mounted in end to end contact positions on a shaft 121, which is secured at its ends in lateral portions of the frame 88. Thus the link connections 119 will permit the necessary flexing movements of the shoe units, but will restrain them from any appreciable rearward motion due to grid plate contact friction. It will of course be understood that under no circumstances will there be a sufficient vertical or pressure adjusting movement to the shoe units to permit the shields 106 to come in contact with the rotary cutter 103.

As the grid plates have their upper surfaces properly and completely finished by the cutter 103, they pass into engagement with a secondary trimming table 122 which cooperates with a set of retention shoes 123 and a secondary cutter 124. These three members function in the same manner as the corresponding members 100, 104, and 103, respectively, but are reversed in positions so that the grid plates will be guided along the under side of the table 122, and have their lower surfaces finished by the rotary cutter 124.

The table 122 is bolted down on the frame 17—18 by bolts 125, and is somewhat longer from front to back than the table 100. The cutter 124 is identical with cutter 103 except that it rotates in the opposite direction, and consequently has its cutting teeth oppositely directed. The shoes 123, as already noted, are substantially identical with the units 104, and are mounted for flexible and adjustable contact with respect to the under sides of the grid plates which are now pressed upwardly against the table 122. The shoe units 123 do not have elements corresponding to fingers 116, but are upwardly sustained by rods 126, nuts 127, cross piece 128, springs 129, stop nuts 130, and cross pins 131, which elements correspond to the members 110, 113, 111, 114, 115, and 108 of the supporting devices for the shoe units 104. In like manner also the secondary shoe units are connected by links 132 to a cross bar 133 corresponding respectively to the links 119 and cross bar or shaft 121 previously described.

As the grid plates pass beyond the cutter 124 they are received upon a plate 134, which projects beyond the rear end of the table 122, and is pivotally mounted as at 135 to a pair of standards 136 of a cross bar 137, which in turn is secured to the side walls 17 and 18 by bolts 138. The forward portion of the receiving plate 134 is yieldably supported by a bar 139, the upper end of which is pivoted thereto as at 140. The bar extends down from the plate, and near its lower end is provided with a collar 141 that rests in a lug extension 142 of the cross beam 137. Lock nuts 143 serve to adjust the collar 141 with respect to the bar 139. The bar 139 is further provided with a pair of lock nuts 144 between which and the collar 141 is interposed a compression spring 145 which tends to lift the rod 139 and the shelf 134 upwardly with respect to the collar 141, the movement in question only being restricted by the lock nuts 143. It will thus be seen that by adjusting the nuts 143 and 144 the elevation of the shelf 134 may be regulated while still permitting the forward portion of the shelf to yield slightly downwardly as occasion may demand.

Attention is now directed to Figs. 9 and 11, where I have illustrated with somewhat distorted proportions the contour of the shoe plates 105 in a vertical, longitudinal plane. Thus it will be seen that I have provided a clearance space 146 through an intermediate portion of the shoe plate so as to reduce as much as possible the frictional contact with the grid plates. It will also be noted that the forward portion of the shoe plate is stepped providing elongated shoulders 147 and 148, both of which have an important function in the proper feed of the grids to the rotary cutter 103. Thus the toe end 148 of the shoe plate has its under surface disposed at a level slightly below the under surface of the shoulder 147, and in turn the shoulder face 147 is slightly lower than the plate surface immediately ahead of it. This arrangement causes the shoulder 147 to ride horizontally against the grid plates as the latter move thereunder, and tend to hold the plates in firm, horizontal contact with the table 100. As the grid plates approach the cutter, however, it is necessary to press them still more firmly in contact with the table so as to properly resist the cutter and properly maintain the grid plates in trimming position. The offsets in the shoe plates are of course connected by slanted surfaces so that the grid plates will not catch or be retarded. In actual practice the clearance above the table surface 100 and the toe 148 is about or less than five one-thousandths (5/1000) of an inch less than the clearance between the table surface and the shoulder 147. This difference, while not substantial in extent, is found to make considerable difference in the successful operation of the machine.

The rotary cutters 103 and 124 are motor driven independently of each other and independently of the power means for operating stripper and feed mechanisms. Except for the facts, that the cutters are rotated and cut in opposite directions, and that one is disposed above and the other below the grid plate passageway, the mechanisms for mounting, adjusting, and driving the cutters are substantially identical, and will now be described.

The rotary cutter 124 (or 103) is provided at one end with a tapered shank 149, terminating in a threaded stud 150 (Fig. 7). The shank 149 is self-centering in a tapered spindle 151 and is securely held therein when the cutter is turned to screw the stud 150 into a socket 152 at the inner end of the spindle. To facilitate turning the cutter, its end, opposite from the shank, is provided with holes 153 for application of a spanner wrench (not shown).

The spindle 151 is journaled in a bearing head 154, and is driven directly from a motor 155 carried by the head 154. The head and motor are rigidly mounted on a casting block 156 having a vertical flange 157 which is dovetail in cross section and slidably guides in a vertical race 158 formed in the side wall 18. At one side the race comprises a V-shaped wedge bar 159 (Fig. 2) secured by bolts 160 in such a manner that when the bolts are tightened the bar 159 will serve as a clamp to rigidly secure the block flange to the frame wall and thus prevent any possibility of movement or vibration. These bolts are of course loosened when the cutter supporting block 156 is to be vertically adjusted.

Below the block 156 the side wall 18 is provided with an outwardly projecting integral lug 161 in which is journaled an upright shaft 162, threaded at its upper end in an integral depending lug 163 of the block 156. The shaft 162 is journaled in lug (161) bearings 164 in such a manner as to permit rotation of the shaft but restrain it from vertical movement, a flange 165 of the shaft riding on the upper bearing. At its lower extremity the shaft 162 has a hand wheel 166 by which the shaft is rotated and this action in turn operates to vertically adjust the block 156. To further insure proper retention of the block in adjusted position I secure a set screw 167 in the lug 161 and provide it with a lock nut 168. This screw abuts upwardly against the block 156 and is preferably tightened and locked after the primary adjustment has first been made with the adjuster wheel 166.

While the operation of the machine will no doubt be understood from the foregoing description thereof, a résumé may be made as follows:

A stack of grid plates is first placed upon the bench 55 between the hopper forming walls 85 and 86, the plates being so arranged that all of the terminal lugs 16 will be disposed in a vertical row in the forward lateral corners of the hopper, as indicated in Figs. 2 and 3. The plate 91 is then adjusted vertically in accordance with the type of grid plate to be sized so that only one plate at a time can pass through the gap between the lower edge of the plate 91 and the bench 55. Other adjustments, including adjustments of the rotary cutters 103 and 124 are then made as accurately as possible and before the machine is started. It may be noted that there is sufficient clearance within the guard 104 to permit necessary vertical adjustments of the cutter 103, and similarly the cutter 124 extends through an opening 169 (Fig. 3) to permit corresponding adjustments to the cutter 124. It may here also be noted that the rotary cutters 103 and 124 are rotatably supported at only one end as by the shanks 149, which arrangement facilitates the removal, replacement, resharpening, or repair of the cutters without in any way dismantling the machine or necessitating the removal of the bearings such as would occur if there were bearing supports at both ends of the cutters.

As an initial step in the operation of the machine, the cutter motors 155 are first started so that the cutters will be rotated and at a high rate of speed as soon as the first grid moves through the passageway. The first grids are initially moved into treatment position by applying a hand crank to the squared end of shaft 28, and as this shaft is slowly rotated the stripper plate 60 will be actuated to engage the lowermost grid plate and move it rearwardly into contact with the feed rolls 29 and 40 which are moved in synchronism with the pitman driving shaft 43. The shaft 43, whether turned by hand or driven in normal machine operation, is timed with respect to the feed speed of the rollers 29 and 40 in such a manner that as soon as the advancing grid plate reaches the point of contact with the feed rolls the stripper plate 60 will become inactive and will start on its return movement under the forward motion of the pitman 47.

It may here be explained that by using an eccentric arrangement, referring to the movement of pin 46 with respect to the axis of shaft 43, the movement of the stripper plate will be relatively slow when first engaging the lowermost grid plate. This movement will then be accelerated until the pin 46 passes over the axis of shaft 43, at which time the movement of the grid plate will be retarded. These differentials in travel speed by the stripper plate are utilized to advantage in this machine. Thus it is highly desirable to begin the stripping action under relatively low speed, and it is equally desirable to slow up the feed speed as the grid plates approach the feed rolls. The feed rolls 29 and 40 rotate at a constant rate of speed, and consequently feed the plates rearwardly into the cutter mechanisms at a constant rate of speed. It would be difficult, however, to strip the plates from under the stack at a constant rate of speed without leaving gaps between the front and rear edges of adjacent grid plates, as they pass through the feed passageway, and such gaps would be objectionable because they would interrupt and possibly disrupt the normal feeding action to and through the cutters, at which time the plates depend for their movement on the direct contact and pressure applied from the succeeding grid plates.

With the present arrangement, however, as one grid plate travels through between the feed rolls, the stripper plate has an opportunity to return for another grid plate, and as this second grid plate approaches the preceding plate the movement is retarded, but not until the two plates are in edge to edge contact with each other. This edge to edge contact is illustrated at the upper end of Fig. 10, while at the lower end and in Fig. 11 is shown how the second plate is just about to close the gap between itself and the first plate.

After a few plates have thus been started through the machine, and all necessary adjustments have been made, the machine is operated by motor power so as to be driven continuously and at a considerably higher rate of speed than is ordinarily done when operated by hand.

As the grid plates come into engagement with the feed rolls, which feed rolls incidentally may be knurled or slightly roughened to effect a better gripping action, they are moved progressively and in edge to edge contact over the table 100 and under the shoe units 104. These units, as previously noted, exert a downward pressure to hold the grids in proper contact with the table 100, and are mounted in such a manner that they may yield or flex both longitudinally and transversely so as to distribute the maintaining pressure throughout the entire grid plate area. As the plates pass under the toe 138 of the shoes 104 they come into contact with the rapidly rotating cutter 103, which trims off superfluous metal from the upper surface of the plate as the plate continues to move rearwardly. Suitable means such as a hood connected with a suction tube may be employed to carry off the residue material removed by the trimming cutters. Such removal means, however, forms no part of the present invention and is therefore not shown in the drawings.

As the plates receive treatment from the cutter 103 they continue to move rearwardly through the passageway between the table plate 122 and the upwardly pressed shoes 123 until they reach the rotary cutter 124 which operates to remove the excess material from the lower surfaces of the grid plates, and thus operates to reduce all of the plates to a uniform size thickness. As the plates move beyond the cutter 124 they pass over the shelf 134 from whence they may be removed in any suitable manner. In the present instance this shelf is so arranged with respect to the conveyor chains 15 of the pasting machine that the plates moving beyond the shelf 134 will drop down between the conveyor chains 15 until the terminal lugs 16 rest upon the chains. The sized plates then continue to move into the pasting machine in vertical or depending positions.

Practically the only opportunity for jamming or clogging of the machine is in the stripping operation, and such action can only occur when a distorted or oversized plate has accidentally or otherwise gotten into the stack of plates in the hopper, and when such a contingency occurs, no breakage or appreciable damage will result because as soon as abnormal resistance is offered to the stripper plate 60 the tripping mechanism 64—74 will operate to stop the entire feed mechanism, until the objectionable grid plate has been removed and the machine is otherwise in condition to again function.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A grid plate sizing machine comprising a plate passageway defined in part by a pair of cooperating power driven feed rolls arranged to receive the grid plates therebetween and advance them through the passageway, and a pair of rotary trimmers disposed at opposite sides of the passageway and adapted to extend transversely across and act on opposite surfaces of the grid plates as they advance under the feed roll action.

2. A grid plate sizing machine having a passageway for the passage of grid plates edgewise therethrough, power driven plate engaging roller means for advancing the grid plates progressively through the passageway in edge to edge contact with each other, and a pair of rotary cutters disposed adjacent opposite sides of the passageway and for cutting engagement with the opposite faces of the plates while such plates are advancing under the action of said roller means, said cutters being disposed one in advance of the other so as to successively engage the plates.

3. A grid plate sizing machine having a passageway for the passage of grid plates edgewise therethrough, means for advancing the grid plates progressively through the passageway, and a pair of rotary cutters disposed adjacent opposite sides of the passageway and for cutting engagement with the opposite faces of the advancing plates, said cutters being disposed one in advance of the other so as to successively engage the plates, and a cooperating support member disposed opposite the passageway from each cutter.

4. A grid plate sizing machine having a passageway for the passage of grid plates edgewise therethrough, said passageway being defined in part by a primary plate receiving support and a cooperating primary cutter between which the plates initially pass, and a secondary plate receiving support and a secondary cutter for receiving and acting on plates passing from the primary support and cutters, the positions of the said primary and secondary cutters being reversed in such a manner that the two cutters will act on opposite faces of the plates.

5. A grid plate sizing machine comprising a frame having a passageway defined in part by a transversely disposed stationary support and a transversely arranged cutter cooperating with the support to act on grid plates passing therebetween, a pair of feed rolls disposed in advance of the support and cutter to actuate the plates thereto, a series of shoes disposed between one of said feed rolls and the cutter for pressing the plates into engagement with the support as such plates are moved thereacross and into engagement with the cutter, and means for operating the cutter and feed rolls.

6. A grid plate sizing machine comprising a frame having a passageway defined in part by a transversely disposed stationary support and a transversely arranged cutter cooperating with the support to act on grid plates passing therebetween, a pair of feed rolls disposed in advance of the support and cutter to actuate the plates thereto, a series of shoes disposed between one of said feed rolls and the cutter for pressing the plates into engagement with the support as such plates are moved thereacross and into engagement with the cutter, and means for mounting said shoes so that they may yield, transversely and longitudinally, to conform to the adjacent face contours of plates passing in contact therewith.

7. A grid plate sizing machine comprising a frame having a passageway defined in part by a transversely disposed stationary support and a transversely arranged cutter cooperating with the support to act on grid plates passing therebetween, a pair of feed rolls disposed in advance of the support and cutter to actuate the plates thereto, a series of shoes disposed between one of said feed rolls and the cutter for pressing the plates into engagement with the support as such plates are moved thereacross and into engagement with the cutter, and means for mounting said shoes so that they may yield, transversely and longitudinally, to conform to the adjacent face contours of plates passing in contact therewith, and each of said shoes having a raised portion along its delivery edge adapted to apply slightly greater pressure to the plate than at other points.

8. A grid plate sizing machine comprising a frame having a passageway defined in part by a transversely disposed stationary support and a transversely arranged cutter cooperating with the support to act on grid plates passing therebetween, a pair of feed rolls disposed in advance of the support and cutter to actuate the plates thereto, a series of shoes disposed between one of said feed rolls and the cutter for pressing the plates into engagement with the support as such plates are moved thereacross and into engagement with the cutter, one of said feed rolls having longitudinally spaced annular grooves, and said shoes being provided with extensions disposed in said grooves.

9. A grid plate sizing machine comprising a horizontal bench for supporting a stack of grid plates, a pair of feed rolls, a reciprocating device operative adjacent to the surface of the bench for stripping the lowermost grid plate from the stack and moving into engagement between the feed rolls, a primary trimming table for receiving the grid plates from the feed rolls, a primary rotary cutter cooperating with the table for trimming one face of the grid plates passing thereover, a secondary table, inverted with respect to the primary table, for receiving the grid plates therefrom, and a secondary rotary cutter cooperating with the secondary cutter and for trimming the other faces of the grid plates.

10. A grid plate trimming machine comprising a support for a stack of plates, a stripper for intermittently removing plates from said support, a pair of feed rolls for receiving the removed plates and advancing them in edge to edge contact and at a uniform rate of speed over a table, a rotary cutting roller extending across the table and of sufficient length to transversely engage the entire surface of the plates passing thereunder, and means disposed between the feed rolls and cutting roller for engaging the plates passing therebetween and pressing them into close contact with the table as they pass into engagement with the cutting roller.

11. A grid plate trimming machine comprising a frame having a passageway for the edgewise movement therethrough of grid plates, means for moving the plates progressively through the passageway, and a pair of rotary cutters disposed at opposite sides of the passageway to respectively trim the opposite faces of the plates, said cutters being arranged one in advance of the other, with respect to the length of the passageway, and a stationary plate support member disposed opposite each of the cutters and for cooperation with such cutter to determine the thickness of the plate passing between such support and cutter.

12. A grid plate trimming machine comprising a frame having a passageway for the edgewise movement therethrough of grid plates, means for moving the plates progressively through the passageway, and a pair of rotary cutters disposed at opposite sides of the passageway to respectively trim the opposite faces of the plates, said cutters being arranged one in advance of the other, with respect to the length of the passageway, stationary support members arranged opposite the respective cutters to guide the plates into engagement with the cutters, and resilient means engaging the plates and urging them into close face contact with the supports at points immediately in advance of the cutters.

13. A grid plate trimming machine having a longitudinal passageway for the horizontal edgewise movement of plates therethrough, a rotary cutter extending across and for trimming the upper surface of the plates as they progress through the passageway, a stationary support member disposed over the passageway to receive the grids from said cutter, and a second rotary cutter, disposed under and cooperating with said support member, to trim off the under surface of the plates.

14. A grid plate trimming machine having a longitudinal passageway for the horizontal edgewise movement of plates therethrough, a rotary cutter extending across and for trimming the upper surface of the plates as they progress through the passageway, a stationary support member disposed over the passageway to receive the grids from said cutter, a secondary cutter, arranged transversely under the support member, to trim the under surface of the plates, and resilient means engageable with the plates to press them upwardly into close surface contact with said support member.

15. A grid plate sizing machine comprising a frame having a passageway defined in part by a transversely disposed stationary support and a transversely arranged rotary cutter cooperating with the support to act on grid plates passing therebetween, means for advancing the grid plates through the passageway and into engagement with the rotary cutter, and a yieldable shoe disposed in advance of the cutter and for pressing the plates into close face contact with the support, said shoe having its plate contacting surface recessed between its front and rear extremities.

16. A grid plate sizing machine comprising a frame having a passageway defined in part by a transversely disposed stationary support and a transversely arranged rotary cutter cooperating with the support to act on grid plates passing therebetween, means for advancing the grid plates through the passageway and into engagement with the rotary cutter, and a yieldable shoe disposed in advance of the cutter and for pressing the plates into close face contact with the support, said shoe having its edge portion adjacent the cutter projected beyond its normal plate contacting surface so as to produce additional pressure on the plates at a point immediately before they engage the cutter.

17. A grid plate sizing machine comprising a frame having a passageway defined in part by a transversely disposed stationary support and a transversely arranged rotary cutter cooperating with the support to act on grid plates passing therebetween, means for advancing the grid plates through the passageway and into engagement with the rotary cutter, and a yieldable shoe disposed in advance of the cutter and for pressing the plates into close face contact with the support, said shoe having a member extending as a guard about a portion of the rotary cutter.

18. A grid plate sizing machine comprising a frame having a passageway defined in part by a transversely disposed stationary support and a transversely arranged cutter cooperating with the support to act on grid plates passing therebetween, a series of shoes disposed transversely and immediately in advance of the cutter for pressing the plates into engagement with the support as such plates move thereover and into engagement with the cutter, a bearing member extending transversely of the machine adjacent the shoes, links connecting the respective shoes to such bearing member to prevent movement of the shoes longitudinally of the passageway, and means, independent of said links and bearing member, for exerting yieldable pressure on the respective shoes.

19. A grid plate sizing machine comprising a frame having a passageway defined in part by a transversely disposed stationary support and a transversely arranged cutter cooperating with the support to act on grid plates passing therebetween, a series of shoes disposed transversely and immediately in advance of the cutter for pressing the plates into engagement with the support as such plates move thereover and into engagement with the cutter, link devices attached to the shoes to hold them against movement longitudinally of the passageway while permitting fluctuating movements with respect to the support, and means limiting the proximity of the shoes to the support.

ARTHUR D. LUND.